(12) United States Patent
Camenisch et al.

(10) Patent No.: US 8,139,767 B2
(45) Date of Patent: Mar. 20, 2012

(54) FINE-GRAINED FORWARD-SECURE SIGNATURE SCHEME

(75) Inventors: Jan Camenisch, Rueschlikon (CH); Maciel Koprowski, Gdvnia (PL)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 12/120,349

(22) Filed: May 14, 2008

(65) Prior Publication Data
US 2009/0316886 A1 Dec. 24, 2009

(51) Int. Cl.
*H04L 9/00* (2006.01)
(52) U.S. Cl. ............ 380/44; 380/28; 380/29; 380/30; 380/277; 380/278; 713/167; 713/180; 345/503; 345/522
(58) Field of Classification Search ............ 380/28–30, 380/44, 277–278; 713/167, 180; 705/52; 345/503, 522
See application file for complete search history.

(56) References Cited

U.S. PATENT DOCUMENTS

| | | | | |
|---|---|---|---|---|
| 5,850,450 | A | * | 12/1998 | Schweitzer et al. ............ 380/30 |
| 2001/0014153 | A1 | * | 8/2001 | Johnson .......................... 380/30 |
| 2003/0120931 | A1 | * | 6/2003 | Hopkins et al. ............... 713/180 |
| 2004/0017916 | A1 | * | 1/2004 | Staddon et al. ............... 380/277 |

FOREIGN PATENT DOCUMENTS
JP 11296076 10/1998
* cited by examiner

*Primary Examiner* — Thanhnga B Truong
(74) *Attorney, Agent, or Firm* — Michael J. Buchenhorner; Vazken Alexanian

(57) ABSTRACT

The presented methods form the basis of a forward-secure signature scheme that is provably secure. Moreover, the presented methods form also the basis of a fine-grained forward-secure signature scheme that is secure and efficient. The scheme allows to react immediately on hacker break-ins such that signatures from the past still remain valid without re-issuing them and future signature values based on an exposed key can be identified accordingly. In general, each prepared signature carries an ascending index such that once an index is used, no lower index can be used to sign. Then, whenever an adversary breaks in, an honest signer can just announce the current index, e.g., by signing some special message with respect to the current index, as part of the revocation message for the current time period. It is then understood that all signatures made in prior time periods as well as all signatures make in the revoked period up to the announced index are valid, i.e., non-reputable.

10 Claims, 5 Drawing Sheets

FINE-GRAINED FORWARD-SECURE SIGNATURE SCHEME

TECHNICAL FIELD

The present invention relates to a method for providing a secret cryptographic key and public cryptographic key applicable in a network of connected computer nodes using a signature scheme. Moreover, the invention relates to methods for providing and verifying a signature value on a message in the network of connected computer nodes. A method for communicating the validity of the generated signature value in the event of a detected intrusion is also disclosed herein.

BACKGROUND OF THE INVENTION

Electronic or digital signatures are used to authenticate information, that is to securely tie the contents of an electronic document to a signer, more precisely, to the signer's public key. Only the true signer should be able to produce valid signatures, and anyone should be able to verify them in order to convince oneself that the signer indeed signed the document. While many digital signature schemes have been proposed so far, a few are used in practice today.

Ordinary digital signature schemes suffer from a fundamental shortcoming: once the secret key is leaked, for example because a hacker managed to break into the signer's computer, and, when this leakage is detected, the public key is revoked then all signatures produced by the signer become reputable, i.e., it is no longer possible to distinguish whether a signature was produced by the signer or the hacker. Therefore ordinary signature schemes can pre se not provide non-repudiation. One possibility to achieve non-repudiation is to use a so-called time-stamping service. Here each signature is sent to a trusted third party who signs a message containing the signature and the current date and time. A signature is considered non-reputable if it was time-stamped before the signer revoked her public key. Hence, assuming that the trusted third party's key is never leaked, non-repudiation is guaranteed. However, this solution requires frequent interaction with a trusted third party, e.g., the time-stamping service, which is not desirable.

Another possibility is to change the keys frequently, i.e., to use a different key pair each day and delete all the secret keys of past days. It then is understood that if a day has passed without that the user has revoked that day's key then all the signatures made with respect to the key are non-reputable. This either requires again frequent interaction with the trusted third party, or, the public key becomes large, i.e., a list of many public keys. Forward secure signature schemes as introduced by R. Anderson in "Two remarks on public-key cryptography", Manuscript, presented by the author at the 4th ACM CCS (1997), September 2000, and formalized by Bellare and Miner in "A forward-secure digital signature scheme", In Michael Wiener, editor, Advances in Cryptology—CRYPTO '99, volume 1666 of LNCS, pages 431-448, Springer Verlag, 1999, solve this problem by having only one public key but many secret keys—one for each time period. In fact, most forward secure signature schemes allow one to derive the secret key of the current time period from the one of the previous period in a one-way fashion.

In principle, a forward secure signature scheme can be obtained from any ordinary signature scheme: the signer chooses new secret and public keys for each time period. The public key of the forward secure signature scheme become the set of the ordinary public keys index by the time period for which they are valid. To sign a message the signer uses the secret key of that period. Once a time period has passed, the signer deletes the respective secret key. It is easy to see that this scheme is forward secure. However, the scheme is rather inefficient in terms of (public and secret) storage.

However, current forward secure signature schemes suffer from the following problem. In case of a hacker's break-in all the signatures made in this time-period have to be recalled and the (honest) signer needs to re-issue them. One solution to this is to use small time-periods which only works if the complexity of the key update is comparable to the complexity of signing.

From the above it follows that there is a call for an improved forward secure signature scheme that is more secure and efficient. The scheme should furthermore allow to react on a hacker's break-in immediately without re-issuing signatures for the past.

SUMMARY AND ADVANTAGES OF THE INVENTION

In accordance with a first aspect of the present invention, there is given a method for providing a secret cryptographic key sk and a public cryptographic key pk applicable in a network of connected computer nodes using a signature scheme. The method is executable by a first computer node and comprises the steps of generating the secret cryptographic key sk by selecting two random factor values P, Q, multiplying the two selected random factor values P, Q to obtain a modulus value (N), and selecting a secret base value g', h', x' in dependence on the modulus value N, wherein the secret base value g', h', x' forms part of the secret cryptographic key g', h', x'. The method further comprises generating the public cryptographic key pk by selecting a number I of exponent values $e_1, \ldots, e_I$, and deriving a public base value g, h, x from the exponent values $e_1, \ldots, e_I$ and the secret base value g', h', x', wherein the public base value g, h, x and the modulus value N form part of the public cryptographic key g, h, x, N. The method further comprises the steps of deleting the two random factor values P, Q; and providing the public cryptographic key g, h, x, N within the network; such that the public cryptographic key g, h, x, N and at least one of the selected exponent values $e_1, \ldots, e_I$ is usable for verifying a signature value i, y, a on a message m to be sent within the network to a second computer node for verification.

In a second aspect of the present invention, there is given a method for providing a signature value i, y, a on a message m in a network of connected computer nodes, the method being executable by a first computer node and comprising the steps of selecting a first signature element a; selecting a signature exponent value $e_i$ from a number I of exponent values $e_1, \ldots, e_I$; and deriving a second signature element y from a provided secret cryptographic key $g'_i, h'_i, x'_i$, the message m, and the number I of exponent values $e_1, \ldots, e_I$ such that the first signature element a, the second signature element y, and the signature exponent value $e_i$ satisfy a known relationship with the message m and a provided public cryptographic key g, h, x, N, wherein the signature value i, y, a comprises the first signature element a, the second signature element y, and a signature reference i to the signature exponent value $e_i$, the signature value i, y, a being sendable within the network to a second computer node for verification.

In a third aspect of the present invention, there is given a method for verifying a signature value i, y, a on a message m in a network of connected computer nodes, the method being executable by a second computer node and comprising the steps of receiving the signature value i, y, a from a first computer node; deriving a signature exponent value $e_i$ from the signature value i, y, a; and verifying whether the signature exponent value $e_i$ and part of the signature value i, y, a satisfy a known relationship with the message m and a provided public cryptographic key g, h, x, N, otherwise refusing the signature value i, y, a, wherein the signature value i, y, a was generated from a first signature element a, a number I of exponent values $e_1, \ldots, e_I$, a provided secret cryptographic key $g'_i, h'_i, x'_i$, and the message m.

In a fourth aspect of the present invention, there is given a method for communicating within a network of connected computer nodes the validity of a signature value i, y, a in the event of an exposure of a secret cryptographic key sk relating to the signature value i, y, a, the method comprising the steps of defining an order of exponent values $e_1, \ldots, e_I$; publishing a description of the exponent values $e_1, \ldots, e_I$ and the order of the exponent values $e_1, \ldots, e_I$ within the network; publishing a revocation reference j to one of the exponent values $e_1, \ldots, e_I$ within the network such that the validity of the signature value i, y, a is determinable by using the revocation reference j, the order of exponent values $e_1, \ldots, e_I$, and a provided public cryptographic key pk.

The presented methods form the basis of a forward-secure signature scheme that is provably secure, i.e., its security relies on no heuristic such as the random oracle model. Moreover, the presented methods form also the basis of a fine-grained forward-secure signature scheme that is secure and efficient. The latter scheme allows one to react immediately on hacker break-ins such that signature values from the past still remain valid without re-issuing them and future signature values based on an exposed key can be identified accordingly. In other words, when using the fine-grained forward-secure signature scheme there is no need to re-sign signature values produced in a current time period in the event of a secret-cryptographic-key exposure. Re-signing is tedious, because it would involve to contact the parties again, and possibly some re-negotiating.

In general, the presented methods form the basis of a forward-secure signature scheme, in which each prepared signature value, also referred to as signature, carries an ascending signature reference i, that also is contemplated as an ascending index i. This index i is attached to the signature value i, y, a in a way such that once it is used, no lower index can be used again to sign. Then, whenever an adversary breaks in, an honest signer can just announce the current index, e.g., by signing some special message with respect to the current index, as part of the revocation message for the current time period. It is then understood that all signatures made in prior time periods as well as all signatures make in the revoked period up to the announced index are valid, i.e., non-reputable.

Instead of using time periods, like in ordinary forward-secure signature schemes, the fine-grained forward-secure signature scheme updates the secret cryptographic key whenever a new message is signed. In the event of a break into a signer's system, which can be immediately noticed due to existence of tools called intrusion detection systems, one can revoke the public cryptographic key g, h, x, N and publish the last used index i. Thereby other computer nodes can be informed about the validity of already issued signatures. This prevents other parties form using the exposed provided secret cryptographic key $g'_i, h'_i, x'_i$ to sign while not requiring to re-issue past signatures.

A description of the exponent values $e_1, \ldots, e_I$ can be provided within the network. This allows every interested party to verify the validity of the signature.

It can be defined an order of the selected exponent values $e_1, \ldots, e_I$ for enabling to communicate the validity of the signature value i, y, a in the event of a detected intrusion. This enables the fine-grained property of the presented scheme.

Each of the exponent values $e_1, \ldots, e_I$ can be applied to at most one signature value i, y, a, which allows to provide a secure signature scheme.

A more efficient signature generation can be achieved when the derivation of the signature element y further comprises the step of deriving a signature base value $g_i, h_i, x_i$ by using the provided public cryptographic key g, h, x, N, the provided secret cryptographic key $g'_i, h'_i, x'_i$, and the exponent values $e_1, \ldots, e_I$.

When a new secret cryptographic key $g'_{i+1}, h'_{i+1}, x'_{i+1}$ is derived from the provided secret cryptographic key $g'_i, h'_i, x'_i$ and the selected signature exponent value $e_i$, then the advantage occurs that forward security can be achieved.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

GLOSSARY

The following are informal definitions to aid in the understanding of the description. The signs relate to the terms indicated beside and are used within the description.

| | |
|---|---|
| P, Q | random factor values, preferably primes |
| N | modulus value |
| k | number of bits of N |
| $e_1, \ldots, e_I$ | exponent values |
| $e_i$ | signature exponent value |
| W | seed, part of description of exponent values |
| $QR_N$ | subgroup of squares in $Z^*_N$ |
| l | security parameter |
| $\{0,1\}^l$ | bit-strings of length l |
| g', h', x' | secret base value being part of a secret cryptographic key (sk) |
| $g'_i, h'_i, x'_i$, | provided secret cryptographic key |
| $g'_{i+1}, h'_{i+1}, x'_{i+1}$, | new or updated secret cryptographic key |
| g, h, x | forming a public base value |
| g, h, x, N | public cryptographic key (pk) or provided public cryptographic key (pk) |
| a | first signature element |
| y | second signature element |
| i | signature reference to a signature exponent value $e_i$ |
| j | revocation reference |
| j' | signature reference |
| I | number of signature values producable |
| i, y, a | forming a signature value |

-continued

| | |
|---|---|
| m | message |
| $p_1, p_2, p_3, p_4$ | first, second, third, fourth computer node |
| $t_0$ | starting time |
| T | time period |
| $t_\Delta$ | duration of time period |
| s | number of producable signature values per time period |

DETAILED DESCRIPTION AND EMBODIMENTS

With general reference to the figures, the features of a fine-grained forward-secure signature schemes within a network are described in more detail below.

Figure 1:
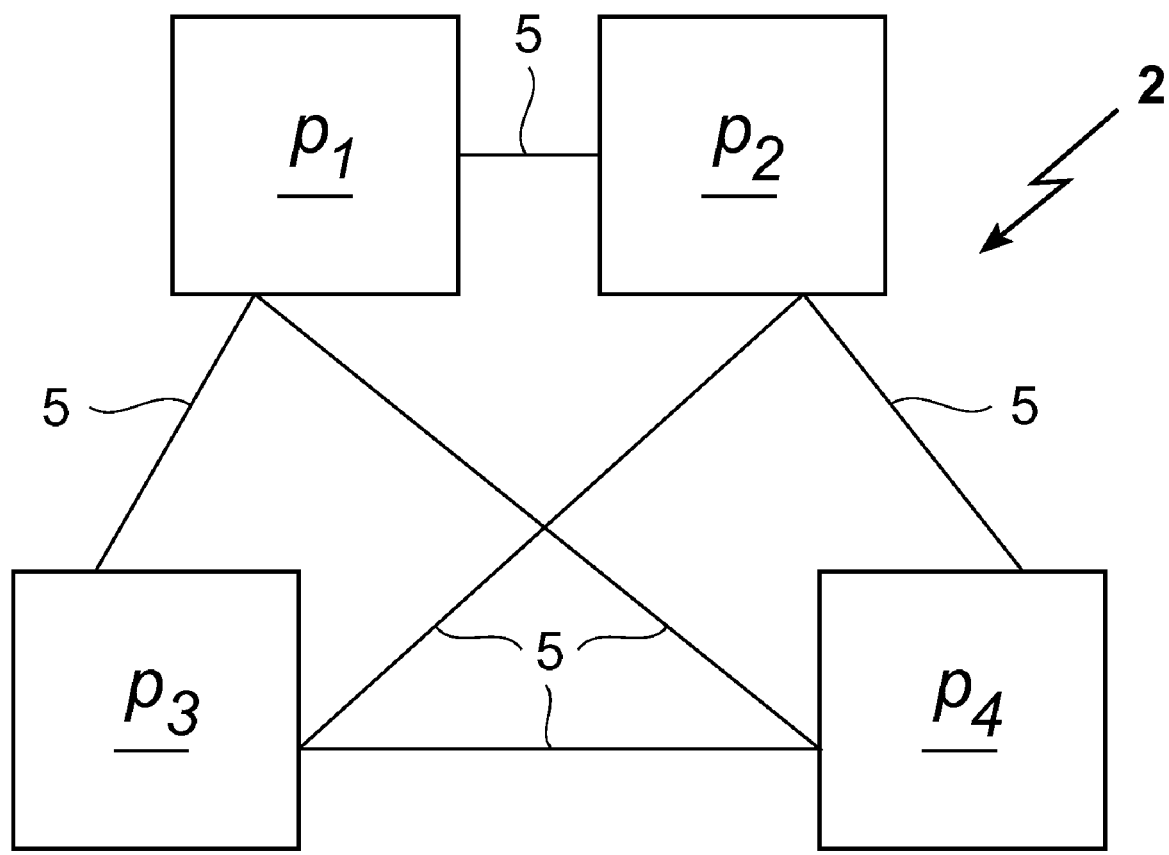
FIG. 1 shows a typical network of connected computer nodes.

Turning to FIG. 1 which shows an example of a common computer system 2. It comprises here a first, second, third, and fourth computer node $p_1, p_2, p_3, p_4$ which are connected via communication lines 5 to a network. Each computer node $p_1, p_2, p_3, p_4$, may be any type of computer device or network device known in the art from a computer on a chip or a wearable computer to a large computer system. The communication lines can be any communication means commonly known to transmit data or messages from one computer node to another. For instance, the communication lines may be either single, bi-directional communication lines 5 between each pair of computer nodes $p_1, p_2, p_3, p_4$ or one unidirectional line in each direction between each pair of computer nodes $p_1, p_2, p_3, p_4$. The common computer system 2 is shown to facilitate the description of the following methods forming and allowing a forward-secure signature scheme and a fine-grained forward-secure signature scheme.

Key Generation

Figure 2:
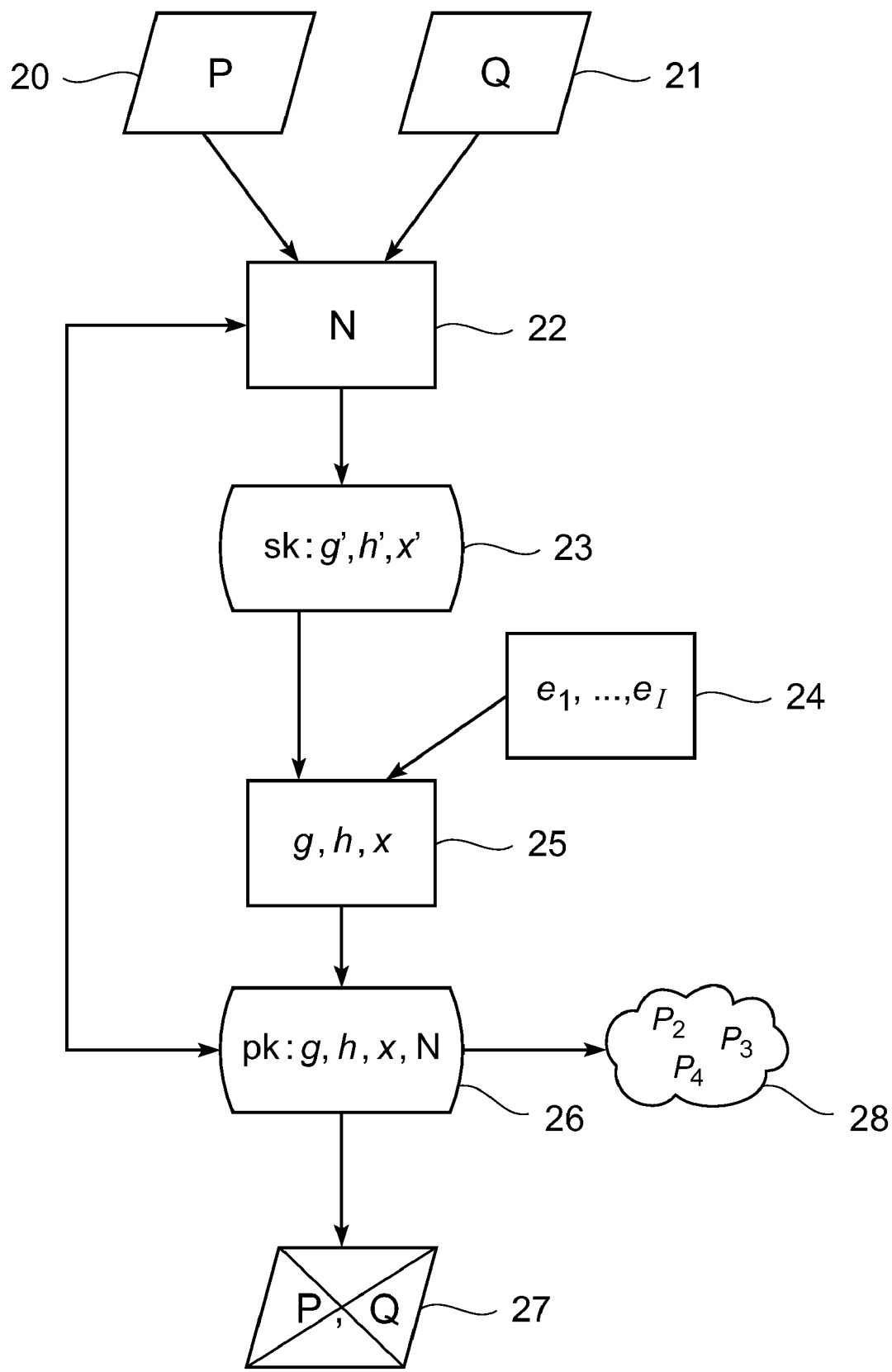
FIG. 2 shows a schematic flow diagram for providing a secret cryptographic key and a public cryptographic key applicable in the network of connected computer nodes.

FIG. 2 shows a schematic flow diagram for providing a secret cryptographic key and a public cryptographic key applicable in the network of connected computer nodes. The steps to be performed are indicated in boxes and labeled with numbers, respectively. The same reference numerals or signs are used to denote the same or like parts.

The generation of a secret cryptographic key sk, also referred to as secret key, and a public cryptographic key pk, also referred to as public key, is here performed by the first computer node $p_1$.

At first, the secret cryptographic key sk is generated by selecting two random factor values P, Q, labeled with 20, 21. These two selected random factor values P, Q are then multiplied and a modulus value N is thereby obtained, as labeled with 22. Then, a secret base value g', h', x' is selected in dependence on the modulus value N, as labeled with box 23, wherein the secret base value g', h', x' forms part of the secret cryptographic key sk, here also denoted as g', h', x'.

At second, the public cryptographic key pk is generated by selecting a number I of exponent values $e_1, \ldots, e_I$, as labeled with box 24. A public base value g, h, x is derived from the exponent values $e_1, \ldots, e_I$ and the secret base value g', h', x', as labeled with 25, wherein the public base value g, h, x and the modulus value N form part of the public cryptographic key pk, also denoted as g, h, x, N, and labeled with 26. The two random factor values P, Q should be deleted afterwards for security reasons, as indicated with 27. The public cryptographic key g, h, x, N is provided within the network, as indicated with 28, such that other computer nodes $p_2, p_3, p_4$ have access to this key. Later on, the public cryptographic key g, h, x N and at least one of the selected exponent values $e_1, \ldots, e_I$ will be usable for verifying a signature value i, y, a, also referred to as signature, on a message m which is to be sent within the network to, e.g., the second computer node $p_2$ for verification purposes.

In the following the generation of the secret cryptographic key sk and the public cryptographic key pk is presented as an embodiment with some more mathematical details. At first a random RSA modulus value N of size k bits is chosen. The modulus value N is preferably a product of two safe primes. By $QR_N$ is denoted a subgroup of squares in $Z^*_N$, whereby all group operations will be performed in this group. It is chosen a random seed W and used by applying some pseudorandom generator to construct the number I random unique l+1-bit prime exponent values $e_1, \ldots, e_I$. Publishing this seed W (as a part of public cryptographic key pk) allows any computer node $p_2, p_3, p_4$ to reproduce the exponent values $e_1, \ldots, e_I$. It is also possible to publish all the exponent values $e_1, \ldots, e_I$ as a part of the public cryptographic key pk. Moreover, since different signers can use the same exponents they can be published by some trusted organization. Further, the secret base value g', h', x' is selected randomly from $QR_N$. It is computed $$g := g'^{\prod 1 \leq i \leq I e_i}, \ h := h'^{\prod 1 \leq i \leq I e_i}, \text{ and } x := x'^{\prod 1 \leq i \leq I e_i}.$$

The public cryptographic key pk is here pk:=N, g, h, x, W. The secret cryptographic key sk is here sk:=g', h', x'. It is set i:=0.

Signing

Figure 3:
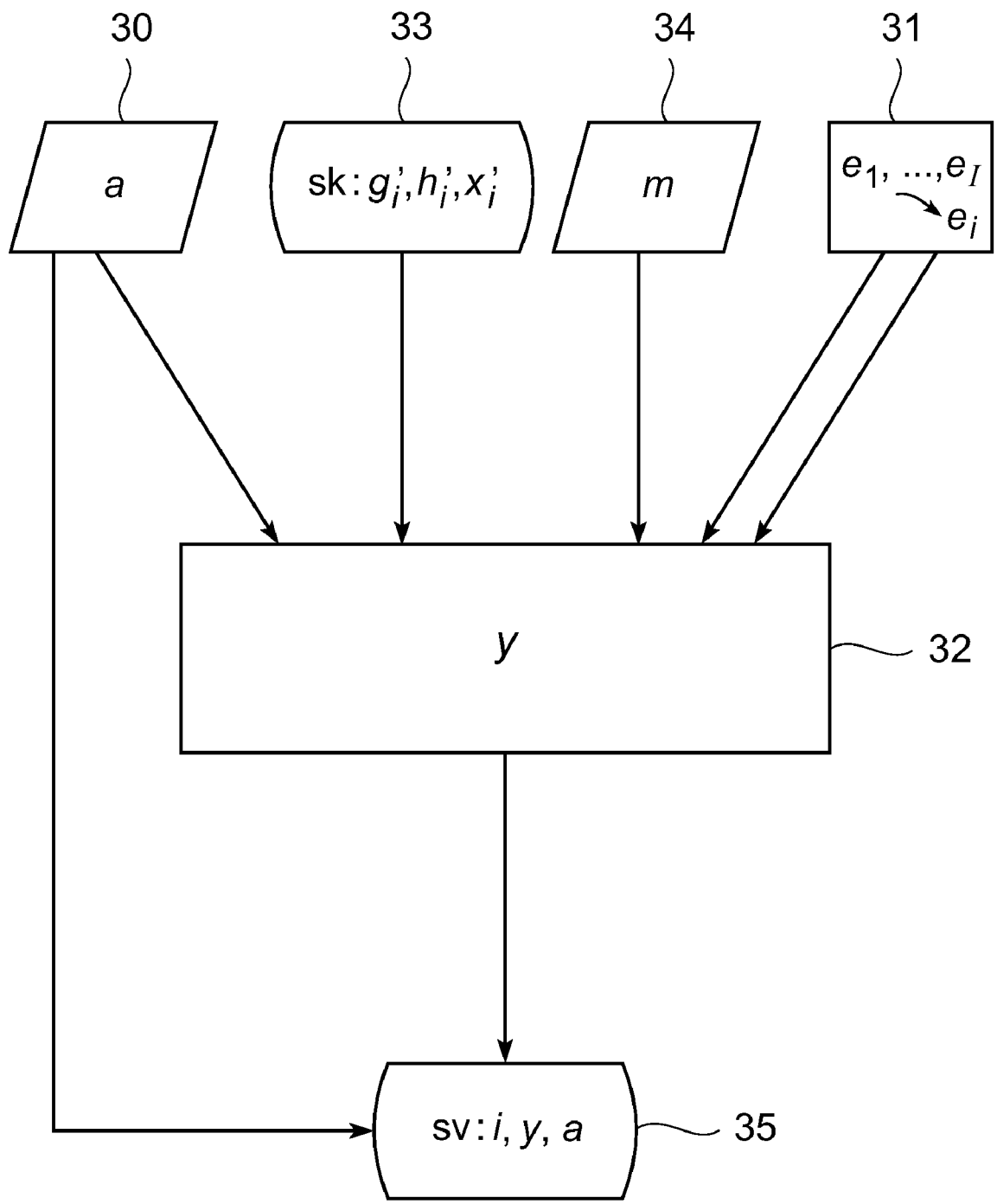
FIG. 3 shows a schematic flow diagram for providing a signature value on a message in the network of connected computer nodes.

FIG. 3 shows a schematic flow diagram for providing a signature value on a message m in the network of connected computer nodes. If the public cryptographic key pk has not yet been revoked, the signature value i, y, a on the message m is here performed by the first computer node $p_1$. The first computer node $p_1$ is also referred to as signer or signing party. At first, a first signature element a is selected, as labeled with 30. Moreover, a signature exponent value $e_i$ is selected from a number I of exponent values $e_1, \ldots, e_I$, as shown in box 31. As indicated with box 32, a second signature element y is derived from a provided secret cryptographic key $g'_i, h'_i, x'_i$, labeled with 33, the message m, which is labeled with 34, and the number I of exponent values $e_1, \ldots, e_I$, such that the first signature element a, the second signature element y, and the signature exponent value $e_i$ satisfy a known relationship, that is representable as a verification equation, with the message m and the provided public cryptographic key pk comprising g, h, x, N. The signature value i, y, a, as labeled with 35, finally comprises the first signature element a, the second signature element y, and a signature reference i to the signature exponent value $e_i$. The signature value i, y, a is then sent within the network to, e.g., the second computer node $p_2$ for verification purposes.

The generation of the signature value i, y, a is addressed hereafter with regard to some more mathematical aspects. It is assumed that the message m is to be signed. If the public cryptographic key pk has been revoked, e.g., because the secret cryptographic key sk has been leaked, or if i>I, i.e., the maximal number of producable signature values has been reached, then signing is aborted. Given the secret cryptographic key $sk_i = g'_i, h'_i, x'_i$ one can compute elements $g_i, h_i,$ and $x_i$ such that $$g_i^{e_i} = g, \ h_i^{e_i} = h, \text{ and } x_i^{e_i} = x.$$

Then, one chooses a first signature element a that is random, with $a \in_R \{0, 1\}^l$, and computes $$y := x_i g_i^a h_i^{a \oplus H(m)}.$$

The signature on the message m is here i, y, a.

After having signed, the secret cryptographic key sk is updated by computing $$g'_{i+1} = g'^{e_i}_i, h'_{i+1} = h'^{e_i}_i, \text{ and } x'_{i+1} = x'^{e_i}_i,$$

and setting the secret cryptographic key sk to $sk_{i+1} := (g'_{i+1}, h'_{i+1}, x'_{i+1})$ and update $i := i+1$.

Signature Verification

Figure 4:
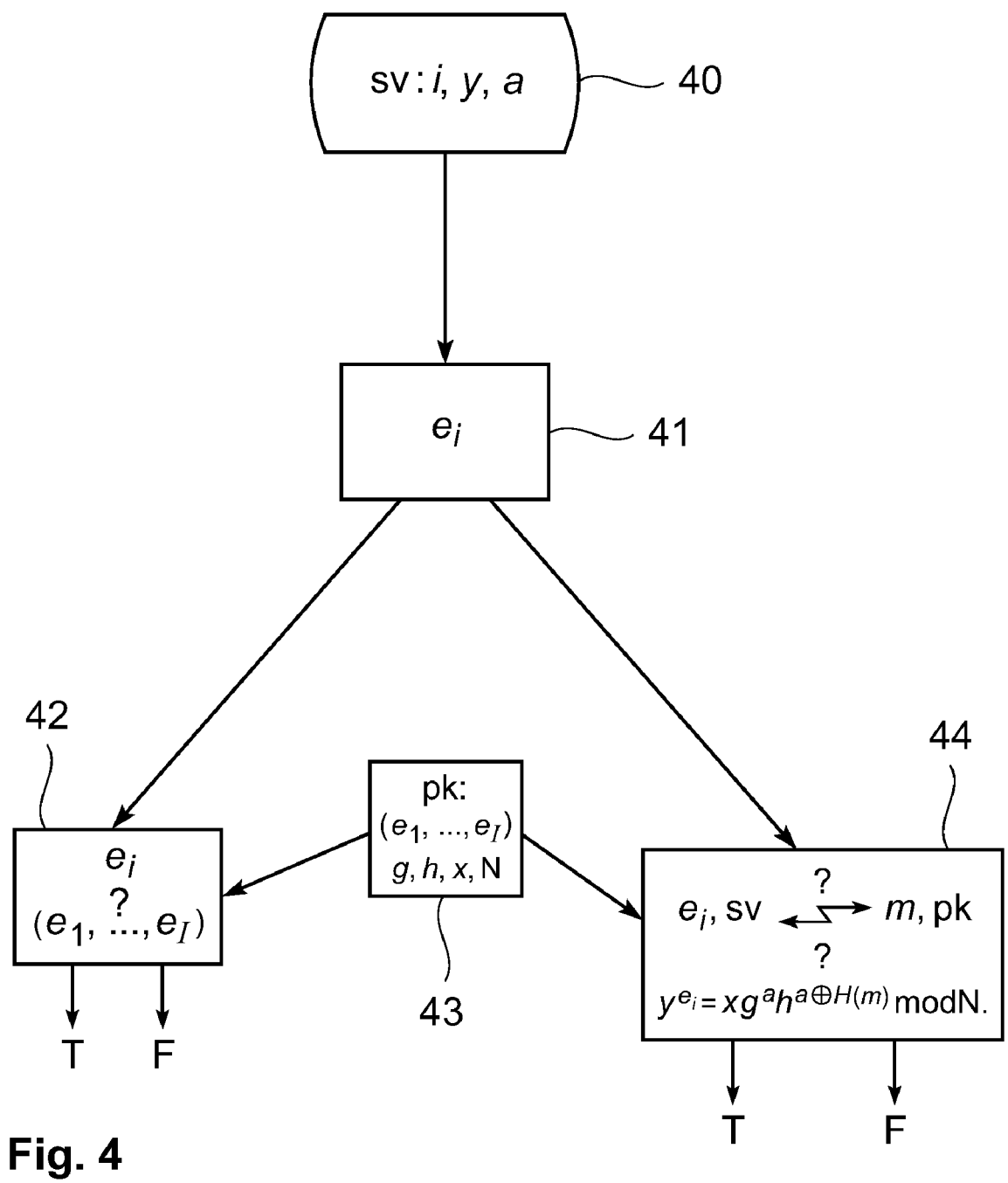
FIG. 4 shows a schematic flow diagram for verifying the signature value.

FIG. 4 shows a schematic flow diagram for verifying the signature value i, y, a. The verification of the signature value i, y, a on the message m is here performed by the second computer node $p_2$. The signature value i, y, a is received by the second computer node $p_2$ from the first computer node $p_1$, as indicated by box 40. Then, the second computer node $p_2$ derives a signature exponent value $e_i$ from the signature value i, y, a, as indicated with box 41. It can be verified whether or not the signature exponent value $e_i$ is a member of a number I of exponent values $e_1, \ldots, e_I$, as indicated with box 42, wherein a description of the of exponent values $e_1, \ldots, e_I$ is accessible within the network, as indicated with box 43. If the signature exponent value $e_i$ is not a member of a number I of exponent values $e_1, \ldots, e_I$ then the signature value i, y, a might be refused. As shown with box 44, it is verified whether or not the signature exponent value $e_i$ and part of the signature value i, y, a satisfy a known relationship, i.e. the verification equation, with the message m and a provided public cryptographic key g, h, x, N, as provided in box 43. When this verification fails, the signature value i, y, a is refused. The results of the verifications 42, 44 are either "true" or "false" as indicated in the figure with "T" and "F", whereby "false" or "F" leads to a refusal of the signature value i, y, a and "true" or "T" to an acceptance. It can be determined that the signature value i, y; a was generated from the first signature element a, the number I of exponent values $e_1, \ldots, e_I$, a provided secret cryptographic key $g'_i, h'_i, x'_i$, and the message m.

In another example, the second computer node $p_2$, that is also referred to as verifier, checks whether or not i, y, a, W is the signature, i.e., the signature value, on the message m. Firstly it is checked if $0 \leq i \leq I$. Secondly the second computer node $p_2$ generates the signature exponent value $e_i$, from the signature reference i and the seed W, that here also is included in the signature value i, y, a, W. Finally the verifier, i.e., the second computer node $p_2$, accepts the signature if the following known relationship, i.e. the verification equation, is fulfilled $$y^{e_i} = x g^a h^{a \oplus H(m)} \bmod N.$$

Revocation

Figure 5:
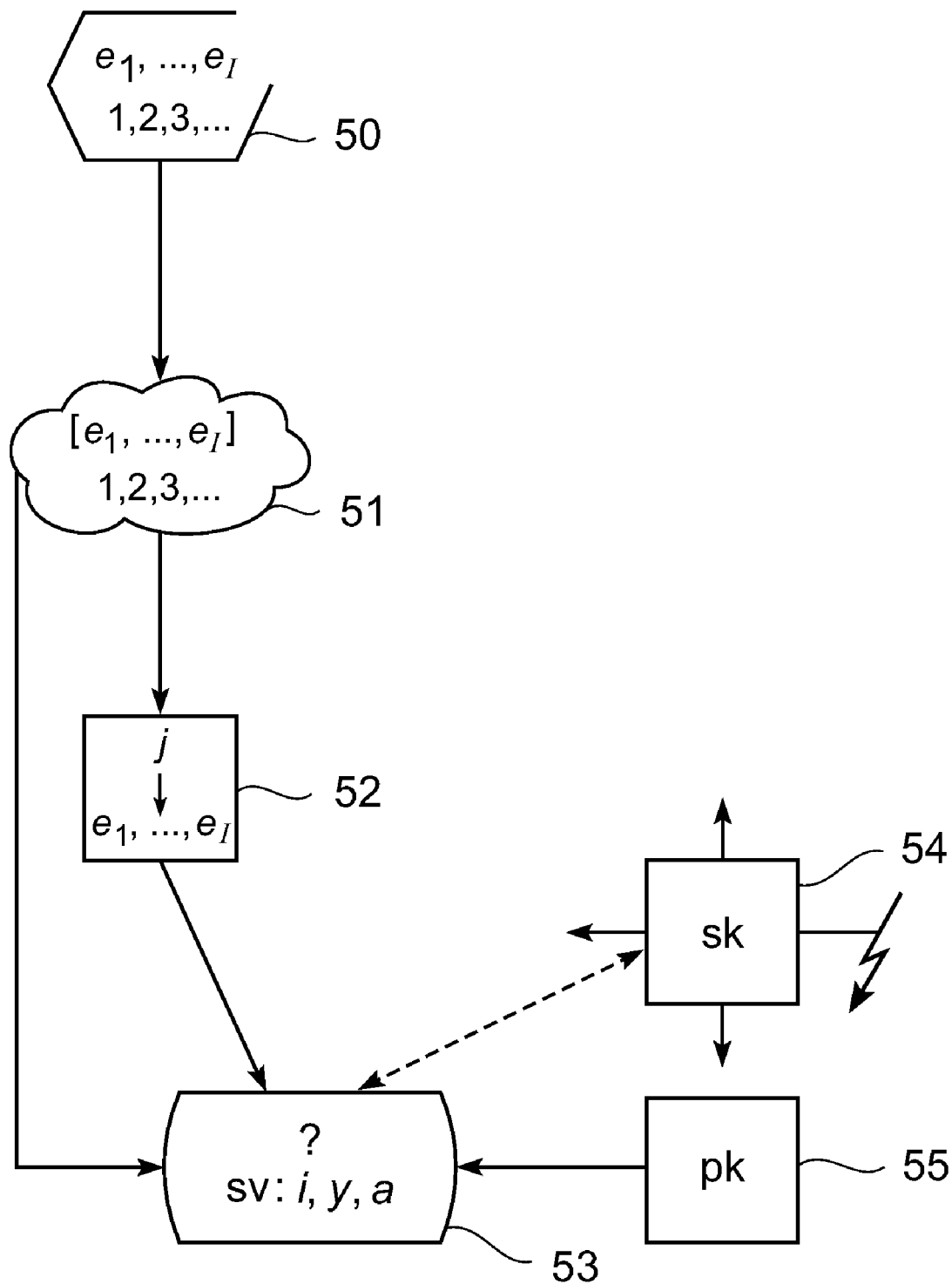
FIG. 5 shows a schematic flow diagram for communicating within the network of connected computer nodes the validity of the signature value in the event of an exposure of a secret cryptographic key relating to the signature value.

FIG. 5 shows a schematic flow diagram for communicating within the network of connected computer nodes, the validity of the signature value i, y, a in the event of an exposure of a secret cryptographic key sk, as indicated with 54, relating to the signature value i, y, a. The validity of a signature value i, y, a is communicated within the network as follows. An order of exponent values $e_1, \ldots, e_I$ is defined, as indicated with 50, whose description is provided within the network, as indicated with 51. The order of exponent values $e_1, \ldots, e_I$ is, also published within the network, as indicated with 51. Furthermore, a revocation reference j to one of the exponent values $e_1, \ldots, e_I$ is published within the network, as indicated with 52, such that the validity of the signature value i, y, a is determinable, as indicated with 53, by using the revocation reference j, the order of exponent values $e_1, \ldots, e_I$, and a provided public cryptographic key pk, shown with 55.

The following provides some more brief embodiments on how to use the presented signature scheme as forward-secure signature scheme and fine-grained forward-secure signature scheme, which are provable secure without random oracles.

Forward-Secure Signature Scheme

The presented signature scheme can be used as forward-secure signature scheme with the particular property that one can sign only one message per time period. That is, one assigns each index i to a time-period rather than to a message.

Being able to sign only a single message per time-period is of course not very practical. However, using any ordinary signature scheme S together with the presented signature scheme, one can obtain a forward-secure signature scheme where one can sign many messages per time-period as follows.

One generates a new instance, i.e., public and secret key pairs, of S (called $S_i$) for each time period $T_i$, with $1 \leq i \leq I$, and signs its public key $pk_i$ as the i-th message in the presented signature scheme.

To sign a message m in time-period $T_i$, one can then use the signature scheme $S_i$ to sign the message m resulting in a signature $s_m$. Thus the final signature on message m comprises the signature $s_m$, the public key $pk_i$, plus the signature on that public key performed with the presented signature scheme applying index i.

Fine-Grained Forward-Secure Signature Schemes

The presented signature scheme does not prevent a dishonest signer from invalidating a signature made in the past by claiming that a break-in happened and publishing an index that is smaller than the one the signer used with that signature. It seems to be unavoidable that a signer is allowed some time (e.g., an hour) after generating a signature during which she can still recall the signature by claiming a break-in happened. This is because the signer should be allowed some time to figure out that a break-in happened and to react to it. In the following three examples I., II., and III. are presented below to overcome this problem.

I. A Two-Level Scheme

It is used one instantiation of the presented signature scheme, call it A-scheme, where each index denotes a time-period, i.e., index i denotes here the time period $T_i$ from $t_0 + i^* t_A$ to $t_0 + (i+1) t_A$, where $t_0$ is the starting time and $t_A$ is the duration of the time-period. The public key of this scheme becomes the public key of a user. Furthermore, a parameter $j_A$ is published as part of the public key, whereby the parameter $j_A$ controls the time the user can take to note that the secret key got compromised.

Then, for each time-period a second instantiation of the presented signature scheme is used, call it $B_i$-scheme, and sign its public key using the A-scheme with respect to the index i of that time-period. After this, the secret key of the A-scheme is updated and the new current index of this scheme becomes i+1.

To sign a j-message of the current time period $T_i$, the $B_i$-scheme with index j is used. The signature on the message comprises this signature, the public key of the $B_i$-scheme, and the signature on this public key made with the A-scheme. Again, after signing the secret key of the $B_i$-scheme is updated and the new current index is $j := j+1$.

Whenever a signer wants to revoke her key, e.g., in time-period $T_{i'}$, she sends a third trusted party, hereafter abbreviated to TTP, a predetermined message that indicates this, signed with the $B_i$-scheme using the current index, here j'. Such a signature is called revocation signature. The TTP verifies the signature and checks whether $T_{i'}$ is the current time period. If this is the case the TTP accepts the revocation and publishes the signature appropriately. The signer is not precluded from revoking several times in the same time period.

A user's signature with indices i and j is considered valid if no revocation happened, or if a revocation with indices i' and j' happened (where i' and j' are the smallest indices of any revocation signature published by the TTP), if i≦i' and j≦j'−$j_A$ holds. Until the time-period in which one signature was signed has not passed, one cannot be sure whether the signature will be valid or not. This, however, holds true for any forward-secure signature scheme.

The reason that the signer is allowed to revoke one key several times is that otherwise an adversary who knows the secret key could send a revocation message with index j' that is higher than the signer's current index. It is easy to see that this gives a fine-grained forward secure signature scheme. Instead of the presented signature scheme, one could use any forward secure signature scheme as A-scheme.

II. Using a Public Archive

The second example replaces the A-scheme in the previous example with a public archive. It is assumed that it is not possible to delete messages from the archive and that messages are published together with the exact time they were received by the archive.

Given such an archive, a fine-grained forward-secure signature scheme is achieved as follows using only one instantiation of the presented signature scheme. The signature on the message m is performed with the presented signature scheme using the current index. After signing, the secret key is updated.

At the end of each time period, the user signs a predetermined message, e.g., <<last index used in time period $T_i$>>, by applying the presented signature scheme and using the current index, here j, and then updates the secret key and sends this index signature to the public archive. The public archive posts the message along with the time it received the signature.

Whenever a signer wants to revoke her key, e.g., in time-period $T_{i'}$, she sends the TTP a preferably predetermined message that indicates this, signed the presented signature scheme using the current index j'. The TTP verifies the signature and checks whether $T'_i$ is the current time period and whether j' is not smaller than the index j of the index signature the signer provided to the public archive during the previous time period. If this is the case the TTP accepts the revocation and publishes the signature appropriately. Again, the signer is not precluded from revoking several times in the same time period.

In this second example, a user's signature with index i is considered valid if no revocation happened, or if revocation happened, if i<j'−$j_A$ or if i<j, where j' is the smallest index of any revocation signatures published by the TTP and j is the index j of the index signature the signer provided to the public archive in the time-period prior to the one in which the key was revoked.

In this example scheme, one cannot be sure that a signature signed in some time-period is valid until the time period % has passed and the signer has published a signature with a higher index in the archive. Compared to the first example solution, the second one has the advantage that signatures are shorter.

For practical reasons, the signer might be allowed some time after the passing of a time-period to publish an index signature in the archive and to perform revocation. This allows one to handle break-in at the very end of a time period. As a consequence, the signer should be allowed to put several index signatures in the public archive per time-period, the one with the lowest index being the one that counts. A signature with index i is then counted valid if no revocation happens, or if revocation happens, if i<j'−$j_A$, where j' is the index of the revocation signature.

III. Allowing s Signatures Per Time-Period

In the third example only one instantiation of the presented signature scheme is used. The index is bound to the time-periods by allowing exactly s signatures per time-period. The parameter s together with $t_0$ and $t_A$ is published as part of the public key.

Thus in time-period $T_i$ the indices i·s, ..., (i+1)s−1 can be used to sign. To revoke a key, the signer sends the revocation signature produced with: the current index j', to the TTP. The TTP verifies the signature and published it if the signature's index matches the current time-period.

The signature with index j is considered valid if no revocation happened, or in case a revocation signature with index j' was published, if j belongs to an earlier time-period that j' or if j<j'−$j_A$.

The rational behind this third example is that the work of signing a message in the presented signature scheme is governed by updating the secret key. Thus one could calculate how many signature one can possibly issue during a time period given the computational power one has and then set s to this number. Then, one would constantly perform the secret key update, even if no message was signed. This approach would not change the response behavior of the system very much, but does not use a public archive and the signatures are smaller than in the first example.

Any disclosed embodiment may be combined with one or several of the other embodiments shown and/or described. This is also possible for one or more features of the embodiments.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method comprising providing a secret cryptographic key and a public cryptographic key applicable in a network of connected computer nodes using a signature scheme, the method being executable by a first computer node and the step of providing comprising:

using an apparatus configured to adapt a transmission parameter to a current link quality of a data communication channel to perform steps of:

generating the secret cryptographic key by:
selecting two random factor values;
multiplying the two selected random factor values to obtain a modulus value; and
selecting a secret base value in dependence on the modulus value, wherein the secret base value forms part of the secret cryptographic key;
generating the public cryptographic key by selecting a number of exponent values, and deriving a public base value from the exponent values and the secret base value, wherein the public base value and the modulus value form part of the public cryptographic key;

deleting the two random factor values;

providing the public cryptographic key within the network, such that the public cryptographic key and at least one of the selected exponent values is usable for verifying a signature value on a message to be sent within the network to a second computer node for verification;

publishing a parameter as part of the public cryptographic key, wherein said parameter sets a time-period during which a user is able to note that the secret cryptographic key was compromised;

using the public cryptographic key and at least one of the selected exponent values usable for verifying a signature value on a message;

sending the message to a second computer node within the network for verification; and aborting signing of the message when the public cryptographic key has been revoked.

2. The method according to claim 1, further comprising providing a description of the exponent values within the network.

3. The method according to claim 1, further comprising defining an order of the selected exponent values for enabling to communicate the validity of the signature value in the event of a detected intrusion.

4. The method according to claim 1, further comprising applying each of the exponent values to at most one signature value.

5. A method comprising providing a signature value on a message in a network of connected computer nodes, the method being executable by a first computer node and the step of providing comprising:

using an apparatus configured to adapt a transmission parameter to a current link quality of a data communication channel to perform steps of:

selecting a first signature element;

selecting a signature exponent value from a number of exponent values;

deriving a second signature element from a provided secret cryptographic key, the message, and the number of exponent values such that the first signature element, the second signature element, and the signature exponent value satisfy a known relationship with the message and a provided public cryptographic key, wherein the signature value comprises the first signature element, the second signature element, and a signature reference to the signature exponent value, the signature value being sendable within the network to a second computer node for verification;

publishing a parameter as part of the public cryptographic key, wherein said parameter sets a time-period during which a user is able to note that the provided secret cryptographic key was compromised;

using the provided public cryptographic key and at least one of the selected exponent values usable for verifying the signature value on the message;

sending the message to a second computer node within the network for verification; and aborting signing of the message when the public cryptographic key has been revoked.

6. The method according to claim 5, wherein the step of deriving the second signature element further comprises deriving a signature base value using the provided public cryptographic key, the provided secret cryptographic key, and the exponent values.

7. The method according to claim 5, further comprising deriving a new secret cryptographic key from the provided secret cryptographic key and the selected signature exponent value.

8. The method according to claim 5, further comprising applying each of the exponent values to at most one signature value.

9. A method comprising verifying a signature value on a message in a network of connected computer nodes, the method being executable by a second computer node and the step of verifying comprising:

using an apparatus configured to adapt a transmission parameter to a current link quality of a data communication channel to perform steps of:

receiving the signature value from a first computer node;

deriving a signature exponent value from the signature value; and verifying whether the signature exponent value and part of the signature value satisfy a known relationship with the message and a provided public cryptographic key;

refusing the signature value when it is determined that the signature exponent value and the part of the signature value do not satisfy a known relationship with the message;

wherein the signature value was generated from a first signature element, a number of exponent values, a provided secret cryptographic key, and the message publishing a parameter as part of the provided public cryptographic key, wherein said parameter sets a time-period during which a user is able to note that the provided secret cryptographic key was compromised;

using the provided public cryptographic key and at least one of the selected exponent values usable for verifying the signature value on the message;

sending the message to a second computer node within the network for verification; and aborting signing of the message when the public cryptographic key has been revoked.

10. The method according to claim 9, further comprising applying each of the exponent values to at most one signature value.

* * * * *

UNITED STATES PATENT AND TRADEMARK OFFICE
CERTIFICATE OF CORRECTION

| | |
|---|---|
| PATENT NO. | : 8,139,767 B2 |
| APPLICATION NO. | : 12/120349 |
| DATED | : March 20, 2012 |
| INVENTOR(S) | : Jan Camenisch and Maciel Koprowski |

It is certified that error appears in the above-identified patent and that said Letters Patent is hereby corrected as shown below:

On the Title Page

Item (63), should read: -- Continuation of application No. 10/522,472, filed on February 6, 2006. --

Signed and Sealed this
Nineteenth Day of November, 2019

Andrei Iancu
*Director of the United States Patent and Trademark Office*

UNITED STATES PATENT AND TRADEMARK OFFICE
CERTIFICATE OF CORRECTION

PATENT NO.         : 8,139,767 B2
APPLICATION NO.    : 12/120349
DATED              : March 20, 2012
INVENTOR(S)        : Jan Camenisch et al.

It is certified that error appears in the above-identified patent and that said Letters Patent is hereby corrected as shown below:

On the Title Page

(75) Inventors: should read as follows:
Jan Camenisch, Rueschlikon (CH);
Maciej Koprowski, Gdynia (PL)

Signed and Sealed this
Seventeenth Day of March, 2020

Andrei Iancu
*Director of the United States Patent and Trademark Office*